US008107791B2

(12) United States Patent
Funaki et al.

(10) Patent No.: US 8,107,791 B2
(45) Date of Patent: Jan. 31, 2012

(54) DISPLAY DEVICE, DISPLAY PROGRAM STORAGE MEDIUM, AND DISPLAYING METHOD

(75) Inventors: Isao Funaki, Kawasaki (JP); Aki Kita, Kawasaki (JP); Eiichi Matsuzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1603 days.

(21) Appl. No.: 11/483,857

(22) Filed: Jul. 11, 2006

(65) Prior Publication Data

US 2007/0206916 A1 Sep. 6, 2007

(30) Foreign Application Priority Data

Mar. 1, 2006 (JP) ................................ 2006-055260

(51) Int. Cl.

| | |
|---|---|
| ***H04N 5/93*** | (2006.01) |
| ***H04N 5/84*** | (2006.01) |
| ***H04N 9/80*** | (2006.01) |
| ***G06F 3/00*** | (2006.01) |
| ***G06F 3/16*** | (2006.01) |
| ***G06F 3/048*** | (2006.01) |
| ***G06F 13/00*** | (2006.01) |
| ***G06K 9/34*** | (2006.01) |

(52) U.S. Cl. ........ 386/280; 386/247; 386/334; 382/171; 715/712; 715/713; 715/727; 715/767; 715/798; 715/838; 715/848; 715/851; 725/52; 725/53

(58) Field of Classification Search .................... 386/52, 386/69, 70, 125, E9.013, E9.036; 348/E5.104, 348/E5.105, E5.112, E7.061; 715/727, 848, 715/712, 713, 767, 798, 838, 851; 725/52, 725/53; 382/171; 707/E17.01, E17.142

See application file for complete search history.

(56) References Cited

U.S. PATENT DOCUMENTS

| | | | | |
|---|---|---|---|---|
| 6,054,989 | A * | 4/2000 | Robertson et al. | 715/848 |
| 2001/0042247 | A1 * | 11/2001 | Inoue | 725/1 |
| 2002/0056095 | A1 | 5/2002 | Uehara et al. | |
| 2003/0123853 | A1 * | 7/2003 | Iwahara et al. | 386/69 |
| 2003/0149982 | A1 | 8/2003 | Nakashima et al. | |
| 2005/0097606 | A1 * | 5/2005 | Scott et al. | 725/52 |
| 2005/0289482 | A1 * | 12/2005 | Anthony et al. | 715/851 |

FOREIGN PATENT DOCUMENTS

CN 1620695 5/2005

(Continued)

OTHER PUBLICATIONS

Office Action issued in corresponding Chinese Patent Application No. 200610115459.1 on Apr. 4, 2008.

(Continued)

*Primary Examiner* — Thai Tran
*Assistant Examiner* — Syed Hasan
(74) *Attorney, Agent, or Firm* — Fujitsu Patent Center

(57) ABSTRACT

A display device configured to display a list of programs stored in a storage device includes: a cutout image acquiring section which acquires a cutout image obtained by cutting out a scene in a program; a distribution date-time acquiring section which acquires distribution date and time when the program is distributed; and a three-dimensional display section which displays a three-dimensional space applying axes respectively of a time, a day of the week, and a week, and which arranges the cutout image acquired by the cutout image acquiring section in a position corresponding to the distribution date and time acquired by the distribution time-date acquiring section in the three-dimensional space.

6 Claims, 11 Drawing Sheets

FOREIGN PATENT DOCUMENTS

| | | | | |
|---|---|---|---|---|
| EP | 0889647 | | | 1/1999 |
| JP | 10-243309 | | | 9/1998 |
| JP | 11-25541 | | | 1/1999 |
| JP | 2001-169197 | | | 6/2001 |
| JP | 2001169197 | A | * | 6/2001 |
| JP | 2001-309269 | | | 11/2001 |
| JP | 3267249 | | | 1/2002 |
| JP | 2002-84469 | | | 3/2002 |
| JP | 2002084469 | A | * | 3/2002 |
| JP | 3340342 | | | 8/2002 |
| JP | 2003-224791 | | | 8/2003 |
| JP | 2003-230067 | | | 8/2003 |
| JP | 2005116059 | A | * | 4/2005 |
| WO | 03/056560 | | | 7/2003 |

OTHER PUBLICATIONS

Japanese Office Action dated Jan. 19, 2010 and issued in corresponding Japanese Patent Application 2006-055260.

* cited by examiner

DISPLAY DEVICE, DISPLAY PROGRAM STORAGE MEDIUM, AND DISPLAYING METHOD

BACKGROUND OF THE INVENTION

1. Field of the Invention

The present invention relates to a display device a display program storage medium, and a displaying method which are configured to display a list of recorded programs.

2. Description of the Related Art

In recent years, it has been a common practice that because an antenna and a television tuner are incorporated in a personal computer, a user watches a television program or records a distributed television program with the personal computer. In addition, a free program dedicated to a personal computer is distributed through the Internet free of charge. As a result, it is anticipated that there is an increase in the number of users utilizing a personal computer instead of a television set or a video cassette recorder.

Incidentally, since a personal computer includes a large-capacity hard disk device, it is possible to record numerous programs without regard to remaining capacity. Moreover, unlike a video cassette recorder with a videotape, it is possible to store the recorded programs without using a large space. In addition, it is easier to copy the recorded programs to digital versatile disks (DVDs) and the like, and to delete unnecessary programs. Accordingly, there are many users who record whatever programs which they are interested in, for the time being, in their personal computers. As a consequence, in some cases, a number of unviewed programs may be stored in hard disk devices in those personal computers. In that case, it is extremely difficult to seek a desired program out of the recorded programs.

As techniques to display a list of programs, Japanese Patent Applications Nos. H 11(1999)-25541, 2002-84469, and H 10(1998)-243309 disclose techniques designed to display a list of programs in which titles of programs scheduled to be distributed are arranged in a three-dimensional space formed by axes of representing a time, a day of the week, a week, and the like. Although these techniques are originally intended to display the list of programs scheduled to be distributed, it is possible to use the techniques to display a list of recorded programs, and thereby, to quickly recognize the distribution date and time of those programs. Moreover, by arranging the titles of the programs in the three-dimensional space formed by the axes of representing the time, the day of the week, and the week, it is possible to arrange the titles of the programs in the same line in the case of drama series which are distributed every week on the same day every week and at the same time. When a user wishes to view the drama series continuously, for example, the user can select the series of programs easily.

These techniques enable the user to recognize when programs recorded and stored in the hard disk device were distributed. However, in a case where the hard disk device stores numerous programs, it is difficult to recall the contents of the respective programs by merely seeing the distribution date and time or the titles of the programs. Meanwhile, in the case of tentatively recording the programs which are distributed at the same time every week on the same day and then viewing a specific program out of the programs recorded over many weeks to watch a desired guest appearing thereon at a later date, for example, it can be understood that the selecting of a certain program from the programs having the same title which are arranged along the week axis serves the purpose. However, it is hard to select the desired program which one of the programs recorded over the weeks represents. This brings about a problem that the user may have to play back the recorded program to check on it.

SUMMARY OF THE INVENTION

The present invention has been made in view of the above circumstances and provides a display device, a display program storage medium, and a displaying method, which enable a user to select a desired program easily even when a large number of programs are recorded.

The display device according to the present invention is a display device configured to display a list of programs stored in a storage device. The display device includes a cutout image acquiring section which acquires a cutout image obtained by cutting out a scene in a program stored in the storage device; a distribution time-date acquiring section which acquires a distribution date and time when the program is distributed, and a three-dimensional display section which displays a three-dimensional space formed by axes respectively of a time, a day of the week, and a week, and which arranges the cutout image acquired by the cutout image acquiring section in a position corresponding to the distribution date and time acquired by the distribution time-date acquiring section in the three-dimensional space.

Heretofore, in addition to titles of program, lists of performers and synopses of programs on television program listings are inserted on newspapers and the like. This information is applied to a display of a list of recorded programs so as to display titles of programs and performers therein in the three-dimensional space formed by the axes respectively of the time, the day of the week, and the week. In this way, even when a number of programs with the same title are recorded, it seems to be possible to select only a desired program out of these programs. Nevertheless, it takes a lot of time to read character information and to determine the contents. Moreover, a space available for displaying information of each program is limited in the case of displaying the list of the programs, and such a spatial limitation may result in small and illegible characters.

According to the display device of the present invention, the cutout image obtained by cutting out the scene in the recorded program is acquired and the cutout image is arranged in the position corresponding to the distribution date and time in the three-dimensional space formed by the axes of the time, the day of the week, and the week. Depending on the position of the cutout image, it is possible to recognize when the recorded program is distributed. Moreover, depending on the design of the cutout image, it is possible to estimate the content of the program. Unlike the character information, the information in the cutout image is discernible at a glance on the design, and it is possible to select a desired program even if numerous programs are recorded. Meanwhile, although such program information is arranged virtually in the three-dimensional space, the information is in fact displayed physically in a two-dimensional space. Therefore, when more pieces of the program information in a certain-sized space are intended to be displayed, some pieces of the program information overlap each other. At this time, in terms of the character information, character string may partially overlap one another and such overlaps may complicate understandings of the respective contents in many cases. By contrast, in terms of the cutout images, there is a chance to estimate the contents only by use of color information of backgrounds partially appearing in the display as a result of such overlaps in the best case. In addition, it is possible to display the cutout images by adding icons for identification or frames in different colors in order to distinguish between recorded broadcast programs that have been viewed already and recorded broadcast programs that have not been viewed yet. In this way, it is possible to offer some information effective for selecting a desired program even with overlaps unless any of the cutout images completely overlap each other. Accordingly, the display of the program information by use of the cutout images in the three-dimensional space exerts an effect which can not be obtained from a simple combination of the information.

Here, in the display device of the present invention, it is preferable that the cutout image acquiring section acquires a set of multiple cutout images respectively obtained by cutting out multiple scenes in the program, the three-dimensional display section arranges at least one of the multiple cutout images constituting the set into the three-dimensional space, and the display device further includes a cutout image selecting section which selects the cutout image arranged in the three-dimensional space in response to an operation and a set display section which displays the multiple cutout images constituting the set containing the cutout image selected by the cutout image selecting section.

It is possible to estimate the content of the program more reliably by displaying the multiple cutout images which are respectively obtained by cutting out the multiple scenes in the program.

Meanwhile, in the display device of the present invention, it is preferable that the three-dimensional display section displays the three-dimensional space while omitting a region in the three-dimensional space without location of the cutout image.

By omitting the region without location of the cutout image, it is possible to enlarge only the necessary region and to achieve a conspicuous display.

Meanwhile, in the display device of the present invention, it is preferable that the display device further includes a genre acquiring section which acquires a genre out of multiple genres used for categorization of the program depending on the genre to which the program stored in the storage device is categorized, and an axis changing section which accepts a changing instruction for replacing the time axis in the three-dimensional space with a genre axis for displaying the multiple genres in response to an operation. Here, the three-dimensional display section displays a new three-dimensional space formed by axes respectively of the genre, the day of the week, and the week instead of the three-dimensional space when the axis changing section accepts the changing instruction, and re-arranges the cutout image in a position in the new three-dimensional space corresponding to the distribution date and time acquired by the distribution date-time acquiring section and the genre acquired by the genre acquiring section.

When roughly confirming when and what kind of program is recorded, for example, it is preferable to display a list of programs by arranging the cutout images in the three-dimensional space formed by the axes respectively of the time, the day of the week, and the week. Meanwhile, when the desired genre such as “a movie” is specified, it is preferable to display a list of programs by arranging the cutout images in the three-dimensional space formed by the axes respectively of the genre, the day of the week, and the week. According to the preferred aspect of the present invention, it is possible to switch between these displays easily.

Meanwhile, in the display device of the present invention, any of the three-dimensional space and the new three-dimensional space may include the uneven axes configured to allocate a wide space to a region where the cutout image is arranged and to allocate a narrow space to a region where the cutout image is not arranged. By allocating the wide space to the region where the cutout image is arranged, it is possible to display the larger cutout image, and to recognize the design of the cutout image reliably.

Meanwhile, according to an aspect of the present invention, a display program storage medium storing a display program which is executed in a computer to construct a display device on the computer for displaying a list of programs stored in a storage device. The display program constructs a cutout image acquiring section for acquiring a cutout image obtained by cutting out a scene in a program stored in the storage device, a distribution time-date acquiring section for acquiring distribution date and time when the program is distributed, and a three-dimensional display section for displaying a three-dimensional space formed by axes respectively of a time, a day of the week, and a week and arranges the cutout image acquired by the cutout image acquiring section in a position corresponding to the distribution date and time acquired by the distribution time-date acquiring section in the three-dimensional space.

According to the display program stored in the display program storage medium of the present invention, it is possible to recognize contents of recorded programs and dates of distributions of the programs by checking the cutout images on the displayed three-dimensional space. Therefore, it is possible to select a desired program easily even when many programs are stored in the storage device.

Here, only the basic aspect of the display program storage medium is explained herein. This is simply for avoiding duplicate explanations. It is to be noted that the display program storage medium of the present invention includes not only the basic aspect but also various other aspects corresponding to the aspects respectively of the display device as described above.

In addition, each of the constituents such as the cutout image acquiring section to be constructed on the computer system by the display program stored in the display program storage medium of the present invention may be constructed by use of a single program component. Alternatively, more than one of the constituents may be constructed by use of a single program component. Moreover, these constituents may be constructed to execute the operations by themselves or to issue instructions to other programs or other program components incorporated in the computer system to execute the operations.

Meanwhile, a displaying method of the present invention is a displaying method displaying a list of programs stored in a storage device, which includes a cutout image acquiring step of acquiring a cutout image obtained by cutting out a scene in a program stored in the storage device, a distribution time-date acquiring step of acquiring distribution date and time when the program is distributed, and a three-dimensional displaying step of displaying a three-dimensional space formed by axes respectively of a time, a day of the week, and a week and arranging the cutout image acquired by the cutout image acquiring section in a position corresponding to the distribution date and time acquired by the distribution time-date acquiring section in the three-dimensional space.

According to the displaying method of the present invention, it is possible to estimate contents and other factors of the programs easily even when numerous programs are recorded.

In terms of the displaying method as well, only the basic aspect of the displaying method is explained herein. This is simply for avoiding duplicate explanations. It is to be noted that the displaying method of the present invention includes not only the basic aspect but also various other aspects corresponding to the respective aspects of the display device as described above.

According to the present invention, it is possible to display a list of recorded programs which facilitates estimation of the contents of the recorded programs.

DETAILED DESCRIPTION OF THE INVENTION

Hereinafter, an embodiment of the present invention will be described below with reference to the accompanying drawings.

Figure 1:
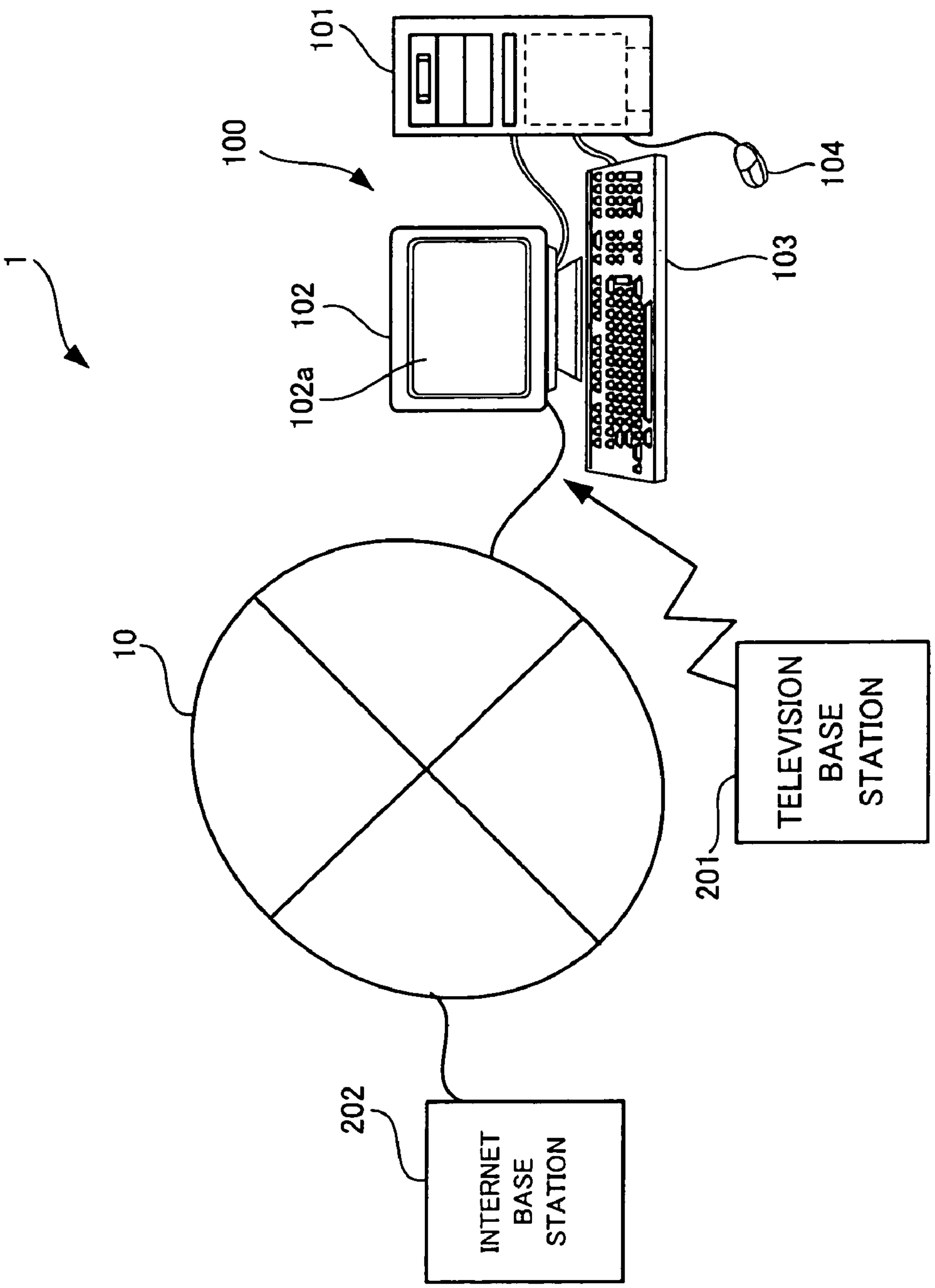
FIG. 1 is a schematic block diagram of a program distribution system to which an embodiment of the present invention is applied.

FIG. 1 is a schematic block diagram of a program distribution system to which an embodiment of the present invention is applied.

This program distribution system 1 includes a television base station 201 and an Internet base station 202, both of which distribute programs, and a personal computer 101 which receives the programs distributed by the television base station 201 and the Internet base station 202. Note that, in reality, numerous base stations, numerous personal computers, and the like are connected to the broadcast distribution system 1. However, FIG. 1 illustrates only the essential constituents for the description of the present invention.

The television base station 201 distributes television programs by use of television waves of a channel allocated to the base station thereof.

The Internet base station 202 distributes programs dedicated to the Internet by use of an Internet connection 10.

In the personal computer 100, includes an antenna as well as a television tuner (see FIG. 2) for receiving the programs distributed by the television base station 201 and an input interface for receiving the programs distributed by the Internet base station 202. The personal computer 100 receives the programs distributed by the television base station 201 and the Internet base station 202, and displays or records the received programs in accordance with operations by a user. This personal computer 100 represents an embodiment of a display device of the present invention. In the following, this personal computer 100 will be described in more detail.

In the external configuration, the personal computer 100 includes a main body 101, an image display device 102 which displays an image on a display screen 102*a* in response to an instruction from the main body 101, a keyboard 103 used for inputting, to the main body 101, various information corresponding to key operations, and a mouse 104 used for designating an arbitrary position on the display screen 102*a* and thereby inputting an instruction corresponding to an object such as icon on the arbitrary position. Moreover, although it is not illustrated in the drawing, this main body 101 also includes a compact disk/digital versatile disk (CD/DVD) loading gate for loading a DVD or a CD-ROM, and a flexible disk (hereinafter abbreviated as FD) loading gate for loading a FD.

Figure 2:
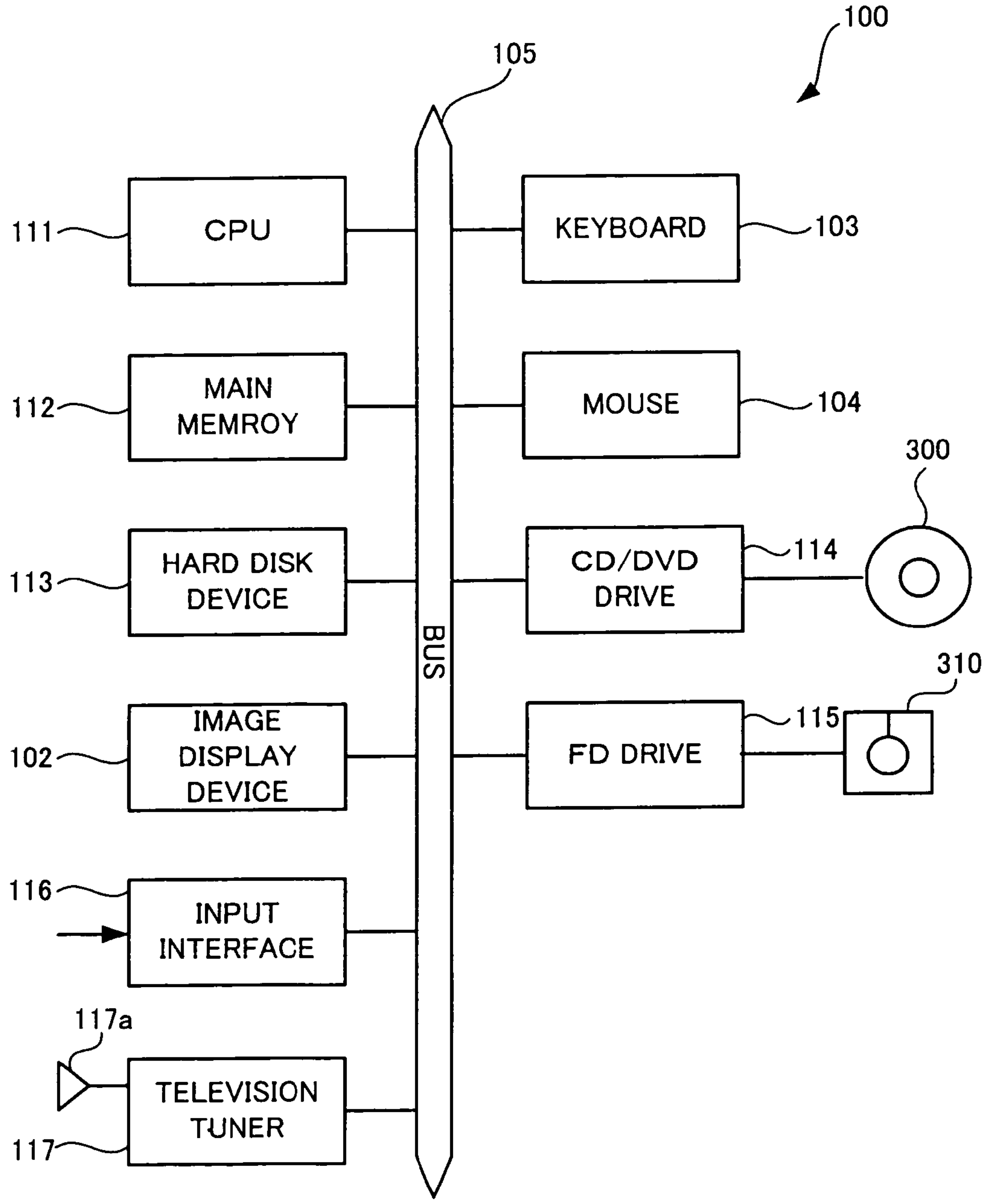
FIG. 2 is an internal block diagram of a personal computer.

FIG. 2 is an internal block diagram of the personal computer 100.

As shown in FIG. 2, the main body 101 includes a central processing unit (CPU) 111 which executes various programs, a main memory 112 in which the programs stored in a hard disk device 113 are retrieved and expanded for execution by the CPU 111, the hard disk device 113 which saves the various programs, data, and the like, a CD/DVD drive 114 which loads and accesses a CD-ROM 300 or a DVD, an FD drive 115 which loads and accesses a FD 310, an input interface 116 which receives the programs and program information from the Internet base station 202 shown in FIG. 1, an antenna 117*a* which receives television waves transmitted from the television base station 201 shown in FIG. 1 or the like, and a television tuner 117 which generates video signals based on the television waves received by the antenna 117*a*. As also shown in FIG. 2, these constituents as well as the image display device 102, the keyboards 103, and the mouse 104 are connected to one another through a bus 105.

Here, the embodiment of a display program storage medium of the present invention is applied to the CD-ROM 300 in which a recording-playback program is stored. The CD-ROM 300 is loaded in the CD/DVD drive 114, whereby the recording-playback program stored in the CD-ROM 300 is uploaded to this personal computer 100 and stored in the hard disk device 113. Moreover, this display program is started and executed and thereby a recording-playback device 500 (see FIG. 4), to which the display device according to the embodiment of the present invention is applied is constructed in the personal computer 100.

Next, the recording-playback program to be executed in this personal computer 100 will be described.

Figure 3:
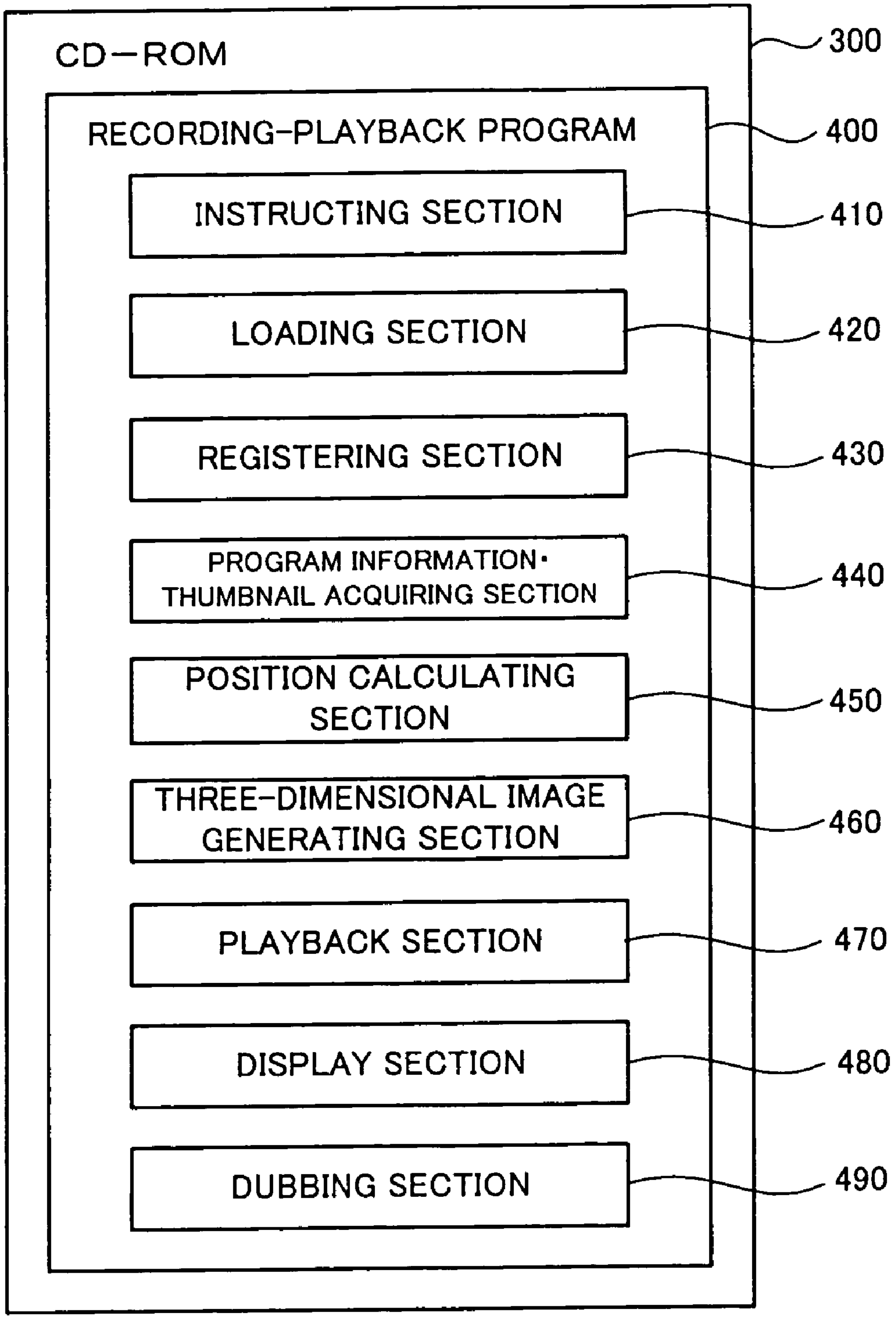
FIG. 3 is a conceptual diagram showing a recording-playback program stored in a CD-ROM.

FIG. 3 is a conceptual diagram showing the CD-ROM 300 storing the recording-playback program.

The recording-playback program 400 includes an instructing section 410, a loading section 420, a registering section 430, a program information-thumbnail acquiring section 440, a position calculating section 450, a three-dimensional image generating section 460, a playback section 470, a display section 480, and a dubbing section 490. Details of the respective sections of the recording-playback program 400 will be described later together with operations of respective sections of the recording-playback device 500.

Note that, in FIG. 3, the CD-ROM 300 is illustrated as an example of the storage medium for storing the recording-playback program. However, the storage medium for recording the display program of the present invention is not limited only to the CD-ROM. The storage medium may be any other storage media such as an optical disk, a magneto-optical disk (MO), a FD or a magnetic tape.

Figure 4:
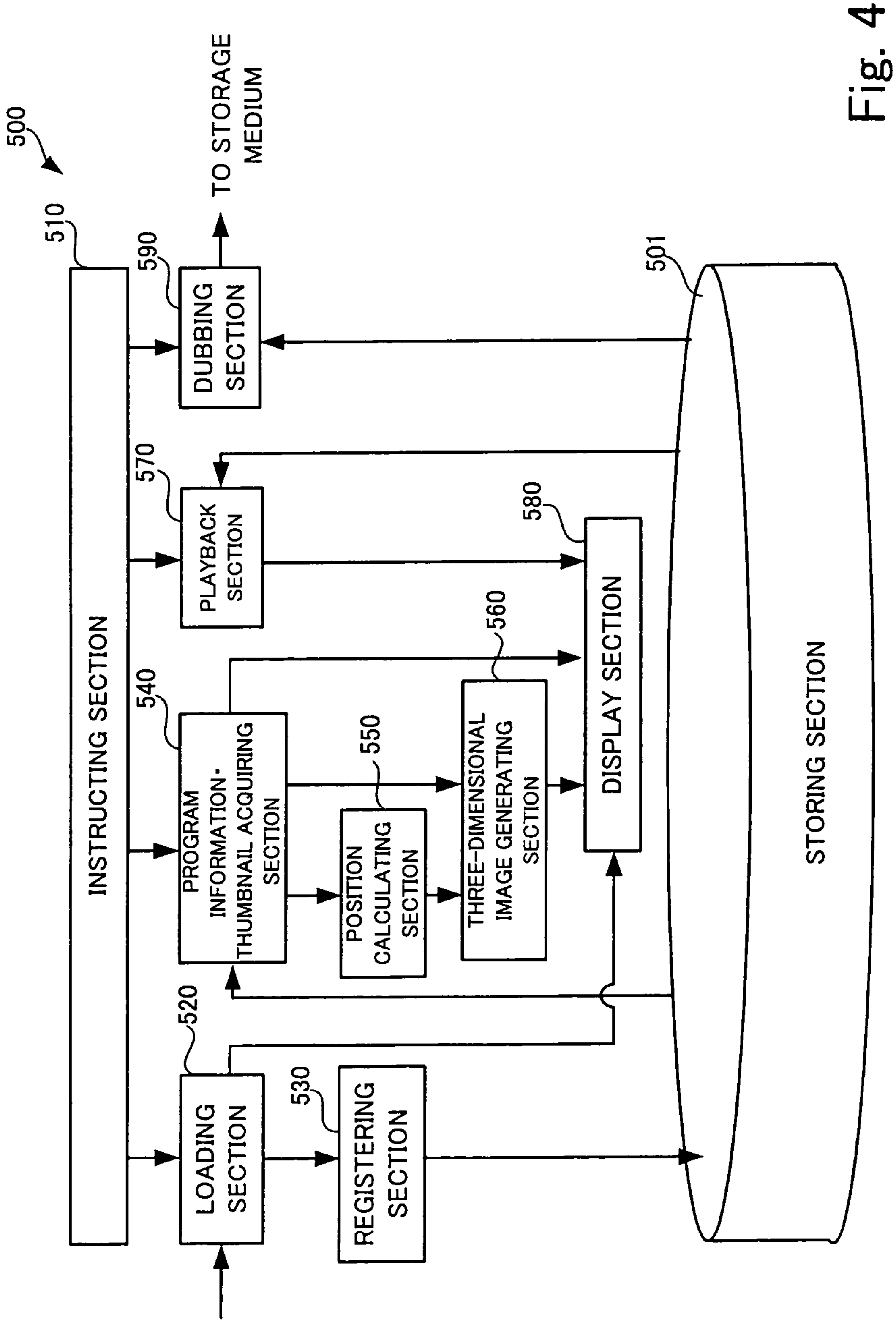
FIG. 4 is a functional block diagram of a recording-playback device.

FIG. 4 is a functional block diagram of the recording-playback device 500 to be constructed in the personal computer 100 after the recording-playback program 400 is installed in the personal computer 100 shown in FIG. 1.

The recording-playback device 500 shown in FIG. 4 includes an instructing section 510, a loading section 520, a registering section 530, a program information-thumbnail acquiring section 540, a position calculating section 550, a three-dimensional image generating section 560, a playback section 570, a display section 580, a dubbing section 590, and a storing section 501. When the recording-playback program 400 is installed in the personal computer 100 shown in FIG. 1, the instructing section 410 of the recording-playback program 400 constructs the instructing section 510 shown in FIG. 4. Likewise, the loading section 420 constructs the loading section 520, the registering section 430 constructs the registering section 530, the program information-thumbnail acquiring section 440 constructs the program information-thumbnail acquiring section 540, the position calculating section 450 constructs the position calculating section 550, the three-dimensional image generating section 460 constructs the three-dimensional image generating section 560, the playback section 470 constructs the playback section 570, the display section 480 constructs the display section 580, and the dubbing section 490 constructs the dubbing section 590.

A difference between the constituents in FIG. 4 and the constituents of the recording-playback program 400, shown in FIG. 3, is as follows. Each of the constituents in FIG. 4 is constructed of a combination of hardware of the computer with an operating program (OS) and application programs to be executed in the computer. By contrast, each of the constituents of the recording-playback program 400, shown in FIG. 3, is constructed solely of the application programs among the combination.

Hereinafter, each of the constituents of the recording-playback device 500 shown in FIG. 4 will be described, thereby describing each of the constituents of the recording-playback program 400 shown in FIG. 3 at the same time.

The instructing section 510, a role of which the keyboard 103 and the mouse 104 shown in FIG. 1 play transmits instructions inputted by a user in accordance with various setting screens displayed on the display screen 102*a* to the constituents respectively corresponding to the inputted instructions. The instructing section 510 corresponds to an example of a cutout image selecting section and an example of an axis changing section of the present invention.

The television waves transmitted from the television base station 201 shown in FIG. 1 are received by the antenna 117*a* shown in FIG. 2. When the user issues an instruction to display or record a television program, the television waves of the designated channel by the instruction of the user are converted into program signals by the television tuner 117. When the user issues the instruction to display the television program, the loading section 520 acquires the program signals from the television tuner 117 and transfers the signals to the display section 580. When the user issues the instruction to record the television program, the program signals are digitalized and transmitted to the registering section 530. Meanwhile, when the user issues an instruction to display or record an Internet program, digital program data transmitted from the Internet base station 202 shown in FIG. 1 are received by the input interface shown in FIG. 2 and acquired by the loading section 520. When the user issues the instruction to display the Internet program, the program data are transferred to the display section 580. When the user issues the instruction to record the Internet program, the program data are transferred to the registering section 530. In the following, both of the analog signals and the digital signals will be collectively referred to as the programs.

The registering section 530 records the program transmitted from the loading section 520, and cut outs and then downsizes multiple scenes in the program to generate a set of multiple thumbnail images. In addition, the registering section 530 saves the recorded program in the storing section 501 together with the program information of the program and the set of the thumbnail images.

The storing section 501, a role of which the hard disk device 113 shown in FIG. 2 plays, saves the recorded program in association with the program information distributed from the base station 201 or 202 and the set of thumbnail images obtained by cutting the multiple scenes out of the program. At this time, the hard disk device which actually saves the program may be arranged at a connecting point on another side of the network.

The program information-thumbnail acquiring section 540 acquires the program information of the program and the set of thumbnail images saved in the storing section 501. The program information-thumbnail acquiring section 540 corresponds to an example of a cutout image acquiring section, an example of a distribution time-date acquiring section, and an example of a genre acquiring section of the present invention.

The position calculating section 550 calculates a position corresponding to a distribution date and time, a genre, and the like included in the program information acquired by the program information-thumbnail acquiring section 540 either in a three-dimensional space formed by axes respectively of a day of the week, a time, and a week (such a three-dimensional space will be hereinafter referred to as a basic three-dimensional space) or in a three-dimensional space formed by axes respectively of the day of the week, the genre, and the week (such a three-dimensional space will be hereinafter referred to as a new three-dimensional space).

The three-dimensional image generating section 560 generates a three-dimensional image by arranging the thumbnail images acquired by the program information-thumbnail acquiring section 540 in the position, which is calculated by the position calculating section 550, either in the basic three-dimensional space or in the new three-dimensional space.

The playback section 570 acquires, from the storing section 501, the program which the user instruct to playback and transmits the acquired program to the display section 580.

The display section 580, a role of which the image display device 102 shown in FIG. 2 plays, includes both of a digital display function to display images based on digital program data and an analog display function to display images based on analog program data. The display section 580 displays the analog program and the digital program transmitted from the loading section 520, the three-dimensional image generated by the three-dimensional image generating section 560, playback video images transmitted from the playback section 570, and the like on the display screen 102*a* shown in FIG. 1. The combination of the position calculating section 550, the three-dimensional image generating section 560, and the display section 580 corresponds to an example of a three-dimensional display section of the present invention. Meanwhile, the display section 580 corresponds to an example of a set display section of the present invention.

The dubbing section 590, a role of which the CD/DVD drive 114 shown in FIG. 2 plays, acquires, from the storing section 501, the program which the user instruct to dub, and performs dubbing of the acquired program on a DVD. Moreover, this section may further include functions to work with the program saved in the storing section 501, such as a function to delete a selected program from the storing section 501.

The recording-playback device 500 is basically constructed as described above.

Subsequently, a series of processing in which the user selects a desired program out of the programs recorded and saved in the storing section 501 will be described.

Figure 5:
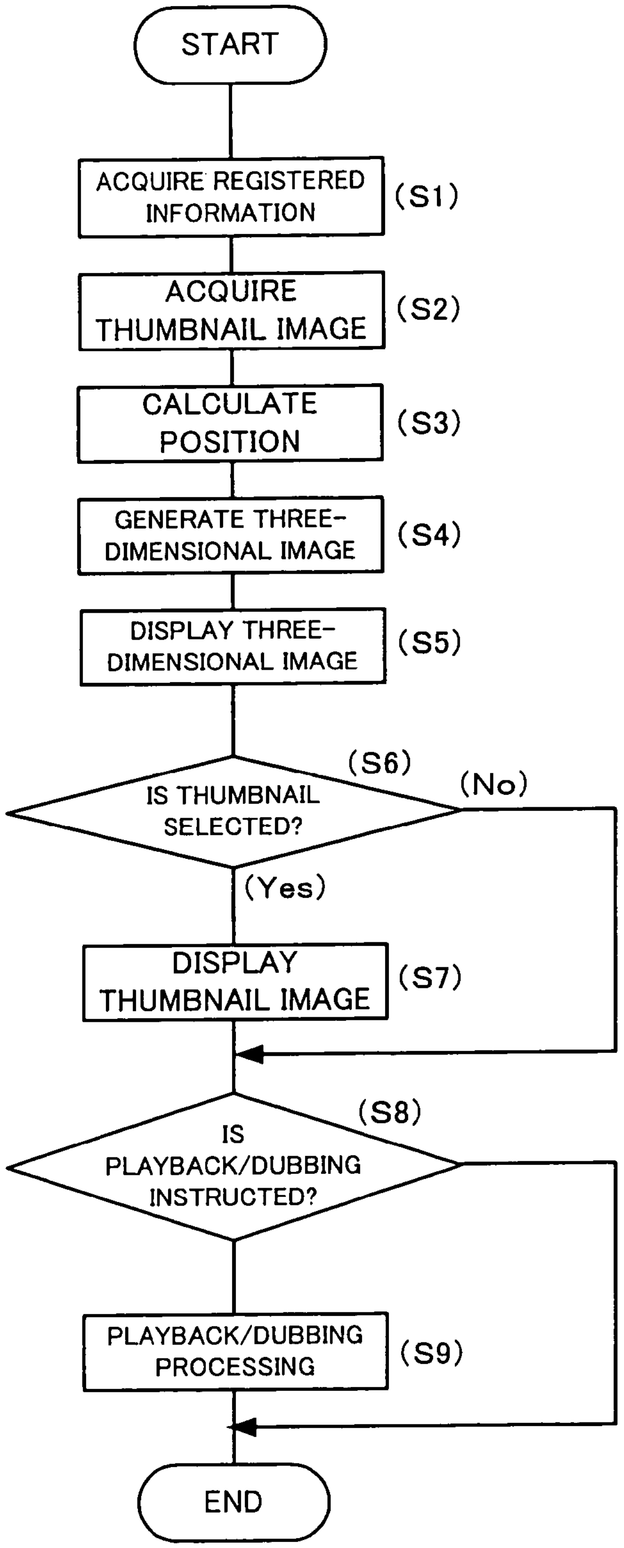
FIG. 5 is a flowchart showing a flow of a series of processing for selecting a desired program out of recorded and saved programs and playing back or dubbing the selected program.

FIG. 5 is a flowchart showing a flow of a series of processing for selecting a desired program out of the recorded and saved programs and playing back or dubbing the selected program.

When the desired program is designated from the recorded program, the user firstly issues an instruction to display a list of the recorded programs saved in the storing section 501. An instruction screen for displaying the list of the recorded programs is prepared in advance in the recording-playback device 500. When the user inputs the instruction for displaying the list with the mouse 104 or the like, the content of the instruction is transmitted from the instructing section 510 shown in FIG. 4 to the program information-thumbnail acquiring section 540.

The program information-thumbnail acquiring section 540 acquires the program information and the thumbnail images saved in the storing section 501 (step 1 and step 2 in FIG. 5).

The following Table 1 shows various information saved in the storing section.

Figure 6:
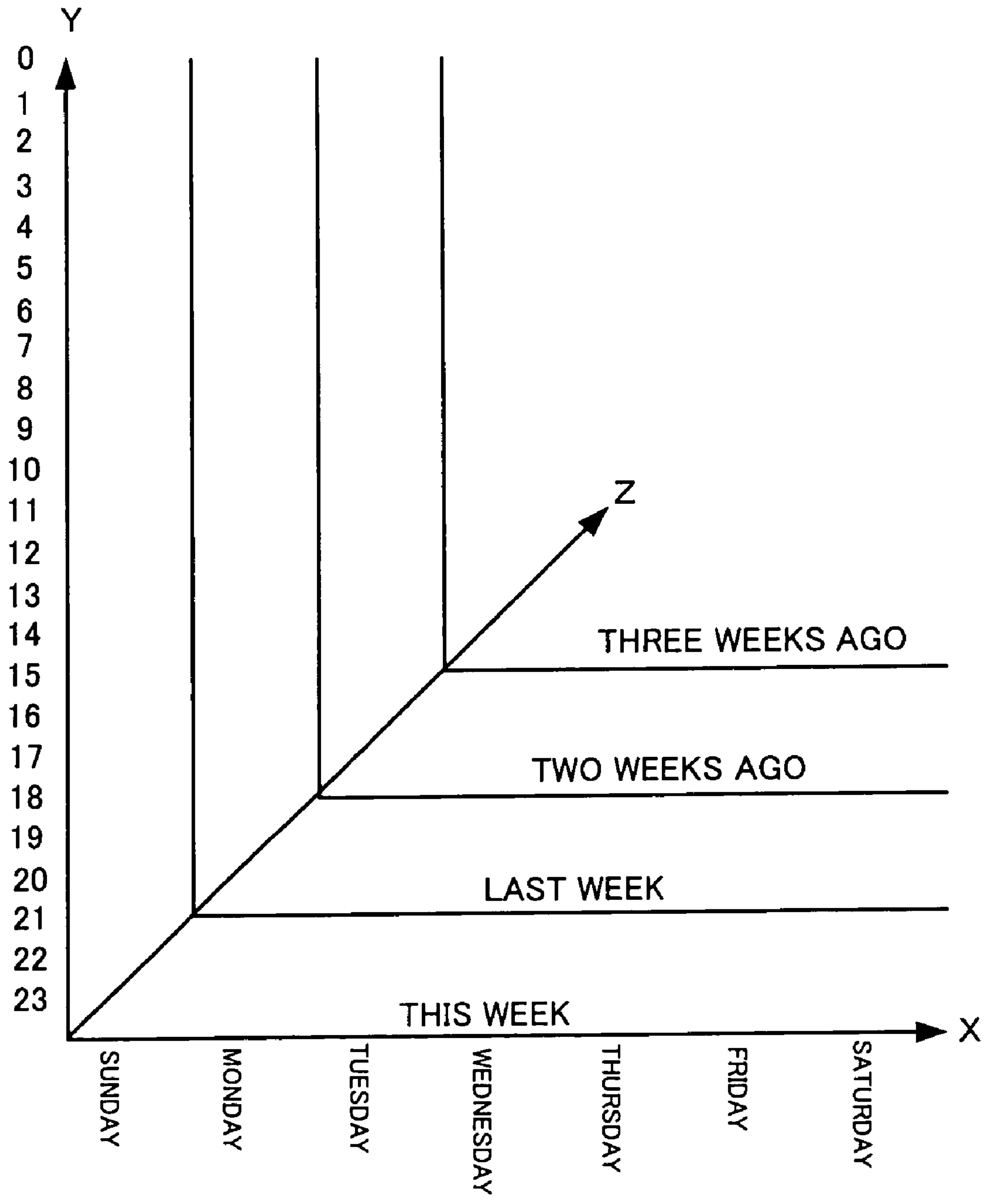
FIG. 6 is a conceptual diagram showing an example of a basic three-dimensional space.

FIG. 6 is a conceptual diagram showing an example of the basic three-dimensional space.

In this embodiment, the basic three-dimensional space with the day of the week on an X axis (in the lateral direction), the time on a Y axis (in the longitudinal direction), and the week on a Z axis (in the depth direction) is adopted.

The days are sequentially arranged on the X axis starting from Sunday, and then Monday, Tuesday, . . . , and Saturday. The day representing a value on the X axis is calculated based on the date "YYYY/MM/DD" in the distribution date and time (expressed as YYYY/MM/DD HH:PP). Since the method for calculating the day from the date has been widely known, the explanation will be omitted herein.

The hours are sequentially arranged on the Y axis starting from 23 o'clock, and then 22 o'clock, 21 o'clock, . . . , 1 o'clock, and 0 o'clock. The "time HH" in the distribution date and time (YYYY/MM/DD HH:PP) is acquired as a value on the Y axis.

The weeks are sequentially arranged on the Z axis starting from this week, and then last week, two weeks ago, and so forth. The week representing a value on the Z axis is calcu-

TABLE 1

| Recorded programs | program information: Distribution date and time | Title of program | Genre | Distributed channel | Sets of thumbnail images | | | | |
|---|---|---|---|---|---|---|---|---|---|
| TV1 | 2005/10/31 08:15 | Morning drama | Drama | TV1 | TV1_Representative 1 | TV1_2 | TV1_3 | TV1_4 | TV1_5 |
| TV2 | 2005/10/31 21:00 | Monday drama | Drama | TV8 | TV2_Representative 1 | TV2_2 | TV2_3 | TV2_4 | TV2_5 |
| TV3 | 2005/11/01 08:15 | Morning drama | Drama | TV1 | TV3_Representative 1 | TV3_2 | TV3_3 | TV3_4 | TV3_5 |
| TV4 | 2005/11/02 08:15 | Morning drama | Drama | TV1 | TV4_Representative 1 | TV4_2 | TV4_3 | TV4_4 | TV4_5 |
| TV5 | 2005/11/03 08:15 | Morning drama | Drama | TV1 | TV5_Representative 1 | TV5_2 | TV5_3 | TV5_4 | TV5_5 |
| TV6 | 2005/11/04 08:15 | Morning drama | Drama | TV1 | TV6_Representative 1 | TV6_2 | TV6_3 | TV6_4 | TV6_5 |
| Internet 1 | 2005/11/05 23:00 | Evening news | News | Net 1 | NET1_Representative 1 | NET1_2 | NET1_3 | NET1_4 | NET1_5 |
| Internet 2 | 2005/11/07 21:00 | Action movie | Movie | Net 2 | NET2_Representative 1 | NET2_2 | NET2_3 | NET2_4 | NET2_5 |

As shown in Table 1, the storing section 501 saves the recorded programs in association with the program information and the thumbnail images. In this embodiment, the program information is composed of distribution date and time, a title of the program, a genre of the program (selected from movie, drama, variety, documentary, news, and educational), and a distributed channel. Moreover, when the recorded program is saved in the storing section 501, the registering section 530 generates a set of multiple thumbnail images by cutting out scenes in the program every 10 minutes, and the first thumbnail image generated in the set is designated as a representative thumbnail image.

The processing in step S1 of acquiring the program information corresponds to an example of a distribution time-date acquiring step in the displaying method of the present invention. Meanwhile, the processing in step S2 of acquiring the thumbnail images corresponds to an example of a cutout image acquiring step in the displaying method of the present invention. The program information thus acquired is transmitted to the position calculating section 550, and the representative thumbnail image among the acquired set is transmitted to the three-dimensional image generating section 560.

The position calculating section 550 calculates a position corresponding to the distribution date and time, which is included in the program information transmitted from the program information-thumbnail acquiring section 540, in the basic three-dimensional space formed by the three axes of the time, the day of the week, and the week (step S3 in FIG. 5).

lated based on the date "YYYY/MM/DD" in the distribution date and time (YYYY/MM/DD HH:PP) on today's date.

The position in the basic three-dimensional space thus calculated is transmitted to the three-dimensional image generating section 560.

By the three-dimensional image generating section 560, the representative thumbnail image transmitted from the program information-thumbnail acquiring section 540 is arranged in the position transmitted from the position calculating section 550. As a result, the three-dimensional image is generated in the three-dimensional image generating section 560 (step S4 in FIG. 5). The three-dimensional image thus generated is transmitted to the display section 580.

The display section 580 displays the three-dimensional image transmitted from the three-dimensional image generating section 560 on the display screen 102*a*.

Figure 7:
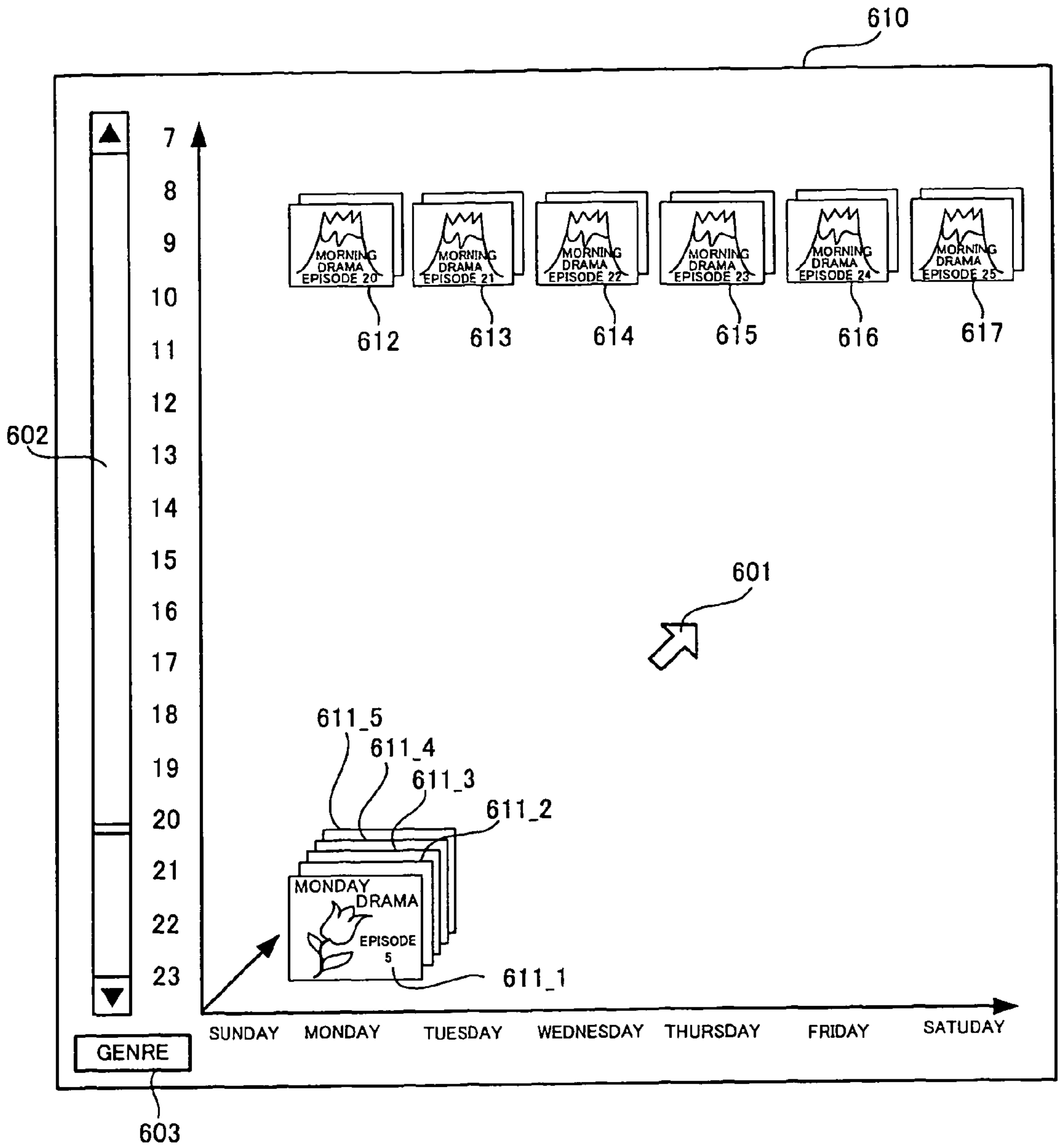
FIG. 7 is a conceptual diagram showing an example of a three-dimensional image displayed on a display screen.

FIG. 7 is a conceptual diagram showing an example of a three-dimensional image 610 displayed on the display screen 102*a*.

In the three-dimensional image 610 shown in FIG. 7, thumbnail images 612, 613, 614, 615, 616, and 617 of programs distributed every day at the same time are aligned and displayed in a straight line along the X axis (representing the day of the week). Meanwhile, thumbnail images 611_1, 611_2, 611_3, 611_4, and 611_5 of programs distributed every week on the same day and at the same time are-arranged and displayed in straight, parallel to the Z axis.

In this way, according to the recording-playback device 500 of this embodiment, the thumbnail images of the programs distributed at the same time are aligned in a straight line in the three-dimensional image 610. Therefore, it is possible to visually check that those programs are mutually related programs such as serial dramas to be distributed every week at the same day or news programs to be distributed every morning at the same time. Moreover, since the thumbnail images in the three-dimensional image 610 are obtained by cutting out the scenes out of the program, it is possible to estimate brief contents of the program by checking designs in the thumbnail images. Furthermore, in this embodiment, the thumbnail images are generated by cutting out the scenes at regular intervals in the programs. Accordingly, it is possible to recognize delays in the distribution time of any of the programs attributable to an extended live baseball program, for example, promptly by checking the designs of the thumbnail images in the three-dimensional image 610 in the case of the programs which displays the program titles every time at the same hour, and the like.

In the initial state, the three-dimensional image 610 shown in FIG. 7 displays a list of the programs distributed and recorded sometime from 7 o'clock to 23 o'clock when the programs are most commonly recorded. Nevertheless, it is possible to display a list of programs recorded sometime from 0 o'clock to 6 o'clock when the user moves a scroll bar 502 by use of a pointer 601.

As the thumbnail images are-arranged in the basic three-dimensional space formed by the three axes of the day of the week, the time, and the week, it is possible to select appropriate programs easily when the user wishes to browse mutually relevant programs such as serial dramas or the like in the recorded order.

Here, a genre button 603 is prepared in the three-dimensional image 610. The genre button 603 is used for arranging and displaying the thumbnail images in the new three-dimensional space formed by the axes of the day of the week, the genre, and the week. When the user selects the genre button 603 by use of the pointer 601, an instruction for changing the axes is transmitted from the instructing section 510 shown in FIG. 4 to the program information-thumbnail acquiring section 540 and to the position calculating section 550.

The position calculating section 550 calculates a position corresponding to the distribution date and time and the genre, which are included in the program information transmitted from the program information-thumbnail acquiring section 540, on the new three-dimensional space with the Y axis by the genre instead of the time. Meanwhile, in the three-dimensional image generating section 560, a three-dimensional image which is arranged in a position newly calculated by the position calculating section 550 in the new three-dimensional space, is generated. The new three-dimensional image thus generated is displayed on the display screen 102*a* by the display section 580.

Figure 8:
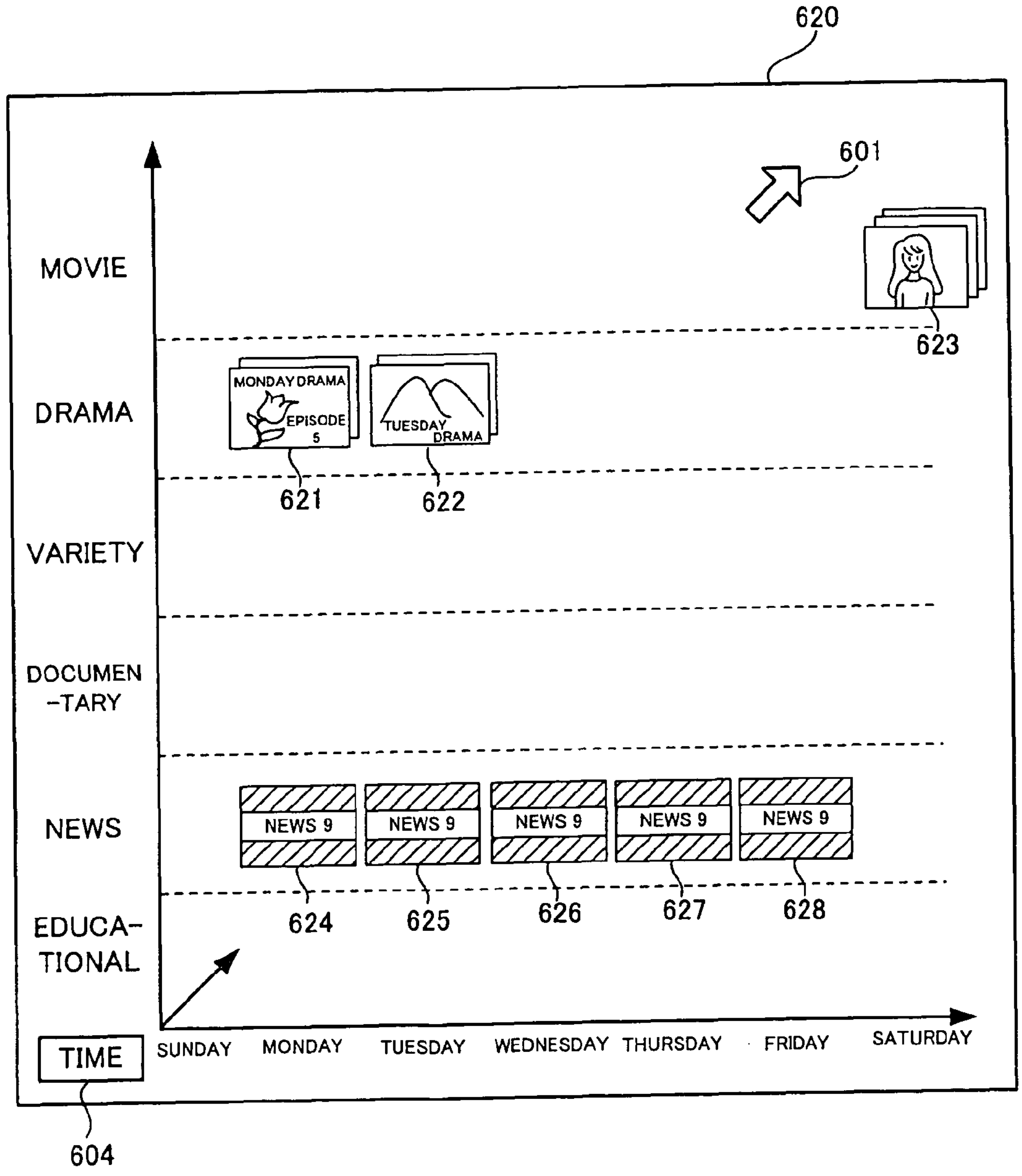
FIG. 8 is a conceptual diagram showing another example of the three-dimensional image displayed on the display screen.

FIG. 8 is a conceptual diagram showing an example of a three-dimensional image 620 displayed on the display screen 102*a*.

In the three-dimensional image 620 shown in FIG. 8, a thumbnail image 623 categorized into a movie out of multiple genres is arranged in a region indicated with "MOVIE" on the Y axis (the genre axis), and thumbnail images 621 and 622 representing programs categorized into dramas are-arranged in a region indicated with "DRAMA" on the Y axis. Meanwhile, thumbnail images 624, 625, 626, 627, and 628 categorized into news are-arranged in a region indicated with "NEWS" on the Y axis. In this way, it is possible to select appropriate programs easily when the user wishes to browse movies by arranging the thumbnail images depending on the genres.

The three-dimensional image 620 shown in FIG. 8 is provided with a time button 604. When the user selects the time button 604 by use of the pointer 601, the three-dimensional image 610 shown in FIG. 7 is displayed instead of the three-dimensional image 620 shown in FIG. 8.

Meanwhile, when the user selects any one of the thumbnail images displayed in the three-dimensional image 610 shown in FIG. 7 or the three-dimensional image 620 shown in FIG. 8 by use of the pointer 601, the selection of the thumbnail image is transmitted from the instructing section 510 shown in FIG. 4 to the program information-thumbnail acquiring section 540 (step S6 in FIG. 5: Yes).

In the program information-thumbnail acquiring section 540, the set including the thumbnail image transmitted from the instructing section 510 is transmitted to the display section 580. The display section 580 arranges and displays the thumbnail images constituting the transmitted set on the display screen 102*a* (step S7 in FIG. 5).

Figure 9:
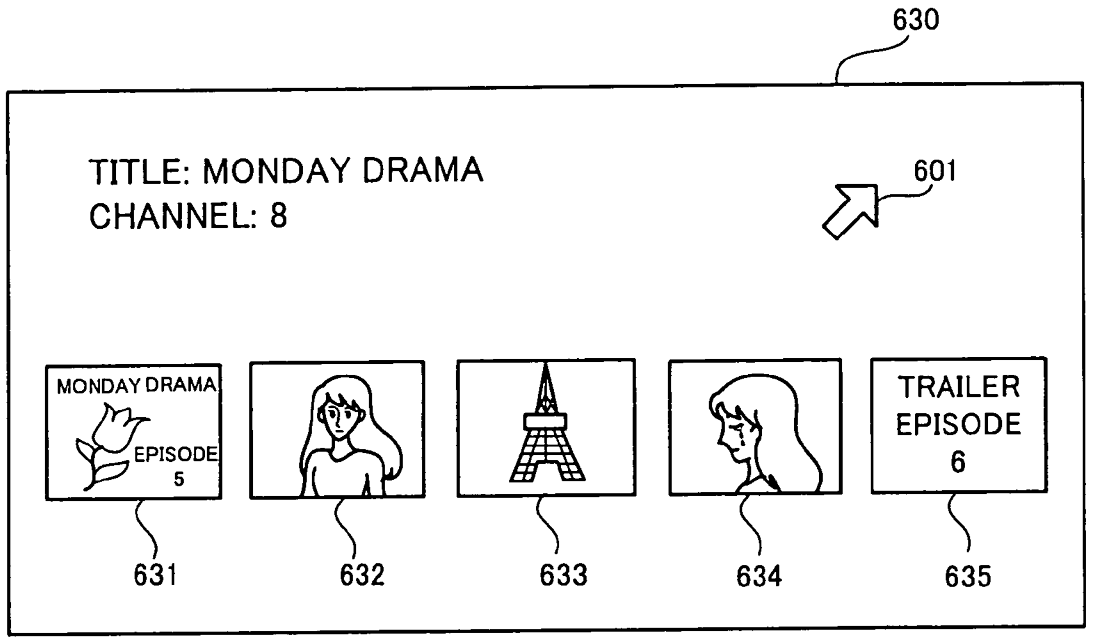
FIG. 9 is a view showing an example of a set screen displaying a set of thumbnail images.
Figure 9:
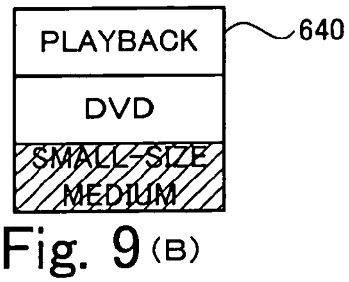

FIG. 9 is a view showing an example of a pop-up window 630 displaying an arrangement of the thumbnail images.

As shown in Part (A) of FIG. 9, multiple thumbnail images 631, 632, 633, 634, and 635 constituting the set including the thumbnail image selected by the user are displayed side-by-side in the pop-up window 630. As the set of the thumbnail images are displayed, it is possible to ensure estimation of the content of the applicable program.

Here, when the user clicks a right button of the mouse 104, another pop-up window is displayed for allowing selection of an instruction for playback or dubbing of the program associated with the selected thumbnail images.

Part (B) of FIG. 9 shows an example of the pop-up window used to instruct playback or dubbing. In this embodiment, the personal computer 100 is not compatible with a small-size storage medium. Therefore, an indicator "small-size medium" on a pop-up window 640 is shaded. When the user selects the instruction displayed on the pup-up window 640 by use of the pointer 601, (step S8 in FIG. 5), the content of the instruction is transmitted to the playback section 570 or the dubbing section 590 shown in FIG. 4. When an indicator "playback" is selected, the playback section 570 acquires the program corresponding to the selected thumbnail from the storing section 501, and the acquired program is transmitted to the display section 580 and is further displayed on the display screen 102*a*. When an indicator "DVD" is selected, the dubbing section 590 acquires the program and the acquired program is stored in a DVD (not shown) loaded in the personal computer 100 instead of the CD-ROM 300 by the CD/DVD drive 114 shown in FIG. 2 (step S9 in FIG. 5).

In this way, according to this embodiment, even when a number of recorded programs are saved in the storing section 501, it is still possible to select a desired program easily out of the numerous programs.

The description of the first embodiment of the present invention has been completed. Now, a second embodiment of the present invention will be described below. In the second embodiment of the present invention, a three-dimensional image to be generated therein is different from those in the first embodiment. However, the second embodiment applies a similar configuration as the configuration of the first embodiment. Accordingly, FIG. 4 is used again in the description of the second embodiment, and only the difference from the first embodiment will now be explained.

A recording-playback device of the second embodiment of the present invention has a similar configuration as the configuration of the recording-playback device 500 of the first embodiment. However, a three-dimensional image to be generated by the three-dimensional image generating section 560 is different from the image generated in the first embodiment.

Figure 10:
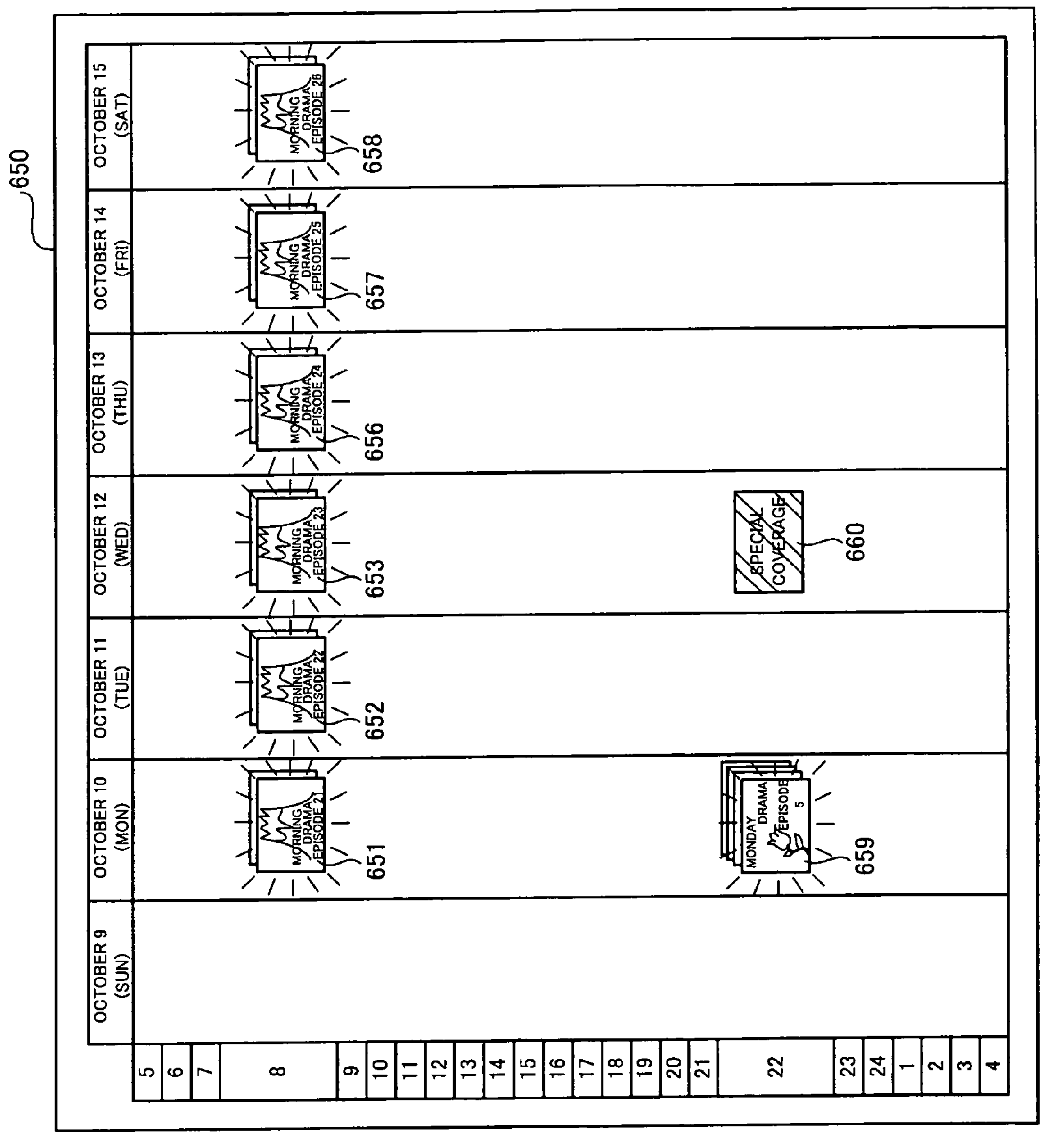
FIG. 10 is a view showing an example of a three-dimensional image to be displayed on a recording-playback device of a second embodiment.

FIG. 10 is a view showing an example of the three-dimensional image to be displayed on the recording-playback device of the second embodiment.

As shown in FIG. 10, in the recording-playback device of this embodiment, the Y axis (the time axis) is not evenly scaled unlike the three-dimensional image 610 of the first embodiment shown in FIG. 7. Specifically, regions where thumbnail images are arranged (regions corresponding to 8 o'clock and 22 o'clock in this example) are wider than the regions where no thumbnail images are arranged. In this way, it is possible to clearly display the thumbnail images, by setting the wider regions corresponding to the positions, which are calculated by the position calculating section 550, where the thumbnail images are arranged.

Moreover, in the three-dimensional image 650 shown in FIG. 10, thumbnail images 651, 652, 653, 656, 657, 658, and 659 arranged in the region on the top of the Z (week) axis (i.e., this week) are highlighted as compared to a thumbnail image 660 arranged in a region on a back side of the Z axis (i.e., last week or earlier). Although it is difficult to recognize the arranged positions of the thumbnail images in terms of the Z axis direction, it is possible to easily confirm new programs recorded this week by highlighting the thumbnail images which are-arranged on the top region.

The description of the second embodiment of the present invention has been completed. Now, a third embodiment of the present invention will be described below. The third embodiment also applies a similar configuration as the configuration of the first embodiment. Accordingly, FIG. 4 is used again in the description of the third embodiment, and only the difference from the first embodiment will now be explained.

In a recording-playback device of the third embodiment of the present invention, not only the representative thumbnail images but the full sets of the thumbnail images are also transmitted from the program information-thumbnail acquiring section 540 to the three-dimensional image generating section 560 during generation of a three-dimensional image. The three-dimensional image generating section 560 firstly omits the regions on the time axis, where the thumbnail images are not arranged, in the basic three-dimensional space formed by the three axes of the day of the week, the time, and the week. Then, the sets of the thumbnail images are arranged in the basic three-dimensional space from which the unnecessary regions are omitted.

Figure 11:
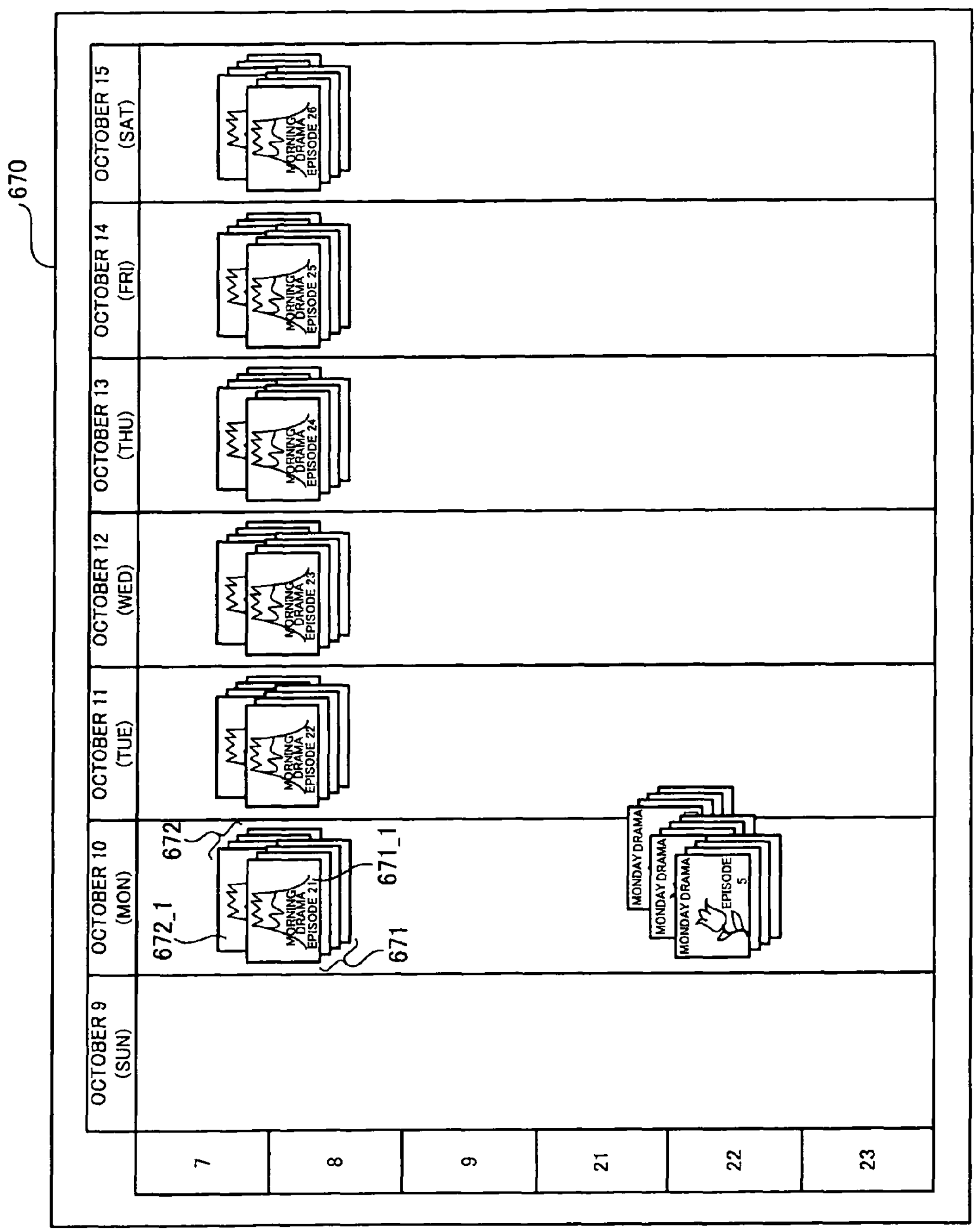
FIG. 11 is a view showing an example of a three-dimensional image to be displayed on a recording-playback device of a third embodiment.

FIG. 11 is a view showing an example of the three-dimensional image to be displayed on the recording-playback device of this embodiment.

In a three-dimensional image 670 shown in FIG. 11, the regions excluding the regions corresponding to the positions where the thumbnail images are-arranged as well as the regions respectively corresponding to one hour earlier and one hour later are omitted in the Y axis (the time axis). In this example, the regions corresponding to only 6 hours, namely, regions corresponding to 8 o'clock and 22 o'clock where the thumbnail images are arranged as well as the regions for 7 o'clock, 9 o'clock, 21 o'clock, and 23 o'clock respectively corresponding to one hour earlier and later than the foregoing time bands are displayed. On the other hand, the region except for the region corresponding to 6 hours is not displayed. In this way, it is possible to expand the regions for arranging the thumbnail images by omitting the unnecessary regions in the three-dimensional space. Moreover, in addition to representative thumbnail images 671_1 and 672_1, all the thumbnail images in the sets 671 and 672 which include the thumbnail images 671_1 and 672_1 are displayed on the three-dimensional image 670 shown in FIG. 11.

Although the above embodiments have been described on the basis of an example of applying the personal computer to the display device, it is also possible to apply a video cassette recorder and other devices to the display device of the present invention.

Moreover, the above embodiments have been described on the basis of an example of generating the thumbnail images in the course of recording the programs. Alternatively, the cutout image acquiring section of the present invention may be configured to acquire the thumbnail images which are generated on the basis of the recorded programs in the course of displaying the list of the programs.

Further, the above embodiments have been described on the basis of an example of generating the multiple thumbnail images by cutting out the scenes of the program at the interval of every 10 minutes. Alternatively, the cutout image acquiring section of the present invention may be configured to acquire cutout images obtaining by cutting out the scenes representing voice peaks in the applicable program. By applying such a voice peak detection technique, it is possible to cut out highlight scenes where the program is exciting.

What is claimed is:

1. A display device configured to display a list of programs stored in a storage device, the display device comprising:
- a cutout image acquiring section which acquires a cutout image obtained by cutting out a scene in a program stored in the storage device;
- a distribution date-time acquiring section which acquires distribution date and time when the program is distributed; and
- a three-dimensional display section which displays a three-dimensional space formed by axes respectively of a time, a day of the week, and a week, and which arranges the cutout image acquired by the cutout image acquiring section in a position corresponding to the distribution date and time acquired by the distribution time-date acquiring section in the three-dimensional space such that a positional relationship between individuals of the cutout image is visible in a depth direction of the three-dimensional space.

2. The display device according to claim 1,
- wherein the cutout image acquiring section acquires a set of a plurality of cutout images respectively obtained by cutting out a plurality of scenes in the program, and
- the three-dimensional display section arranges at least one of the plurality of cutout images constituting the set in the three-dimensional space, and
- the display device further comprises:
- a cutout image selecting section which selects the cutout image arranged in the three-dimensional space in response to an operation; and
- a set display section which displays the plurality of cutout images constituting the set containing the cutout image selected by the cutout image selecting section.

3. The display device according to claim 1,
- wherein, when displaying the three-dimensional space, the three-dimensional display section displays the three-dimensional space except for a region where the cutout image is not arranged.

4. The display device according to claim 1, further comprising:
- a genre acquiring section which acquires a genre to which the program stored in the storage device is categorized among a plurality of genres each used for a program categorization according to the genre; and an axis changing section which accepts a changing instruction for replacing the time axis in the three-dimensional space with a genre axis indicating the plurality of genres in response to an operation, wherein, in a case where the axis changing section accepts the changing instruction, the three-dimensional display section displays a new three-dimensional space formed by axes respectively of the genre, the day of the week, and the week instead of the three-dimensional space and rearranges the cutout image in a position in the new three-dimensional space corresponding to the distribution date and time acquired by the distribution date-time acquiring section and the genre acquired by the genre acquiring section.

5. A non-transitory display program storage medium storing a display program that is executed in a computer to construct, on the computer, a display device displaying a list of programs stored in a storage device, the display program storage medium storing the display program that constructs sections, the sections comprising:

a cutout image acquiring section which acquires a cutout image obtained by cutting out a scene in a program stored in the storage device;

a distribution date-time acquiring section which acquires distribution date and time when the program is distributed; and a three-dimensional display section which displays a three-dimensional space Formed by axes respectively of a time, a day of the week, and a week and arranges the cutout image acquired by the cutout image acquiring section in a position corresponding to the distribution date and time acquired by the distribution time-date acquiring section in the three-dimensional space such that a positional relationship between individuals of the cutout image is visible in a depth direction of the three-dimensional space.

6. A displaying method which displays a list of programs stored in a storage device, the method comprising:

acquiring a cutout image obtained by cutting out a scene in a program stored in the storage device;

acquiring distribution date and time when the program is distributed; and displaying a three-dimensional space formed by axes respectively of a time, a day of the week, and a week and arranging the cutout image acquired by the cutout image acquiring section in a position corresponding to the distribution date and time acquired by the distribution time-date acquiring section in the three-dimensional space such that a positional relationship between individuals of the cutout image is visible in a depth direction of the three-dimensional space.

* * * * *